United States Patent
Lindmark

(10) Patent No.: US 12,113,635 B2
(45) Date of Patent: Oct. 8, 2024

(54) DYNAMIC PARTICIPANT DEVICE MANAGEMENT FOR HOSTING A TELECONFERENCE

(71) Applicant: Google LLC, Mountain View, CA (US)

(72) Inventor: Stefan Lindmark, Östhammar (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/945,523

(22) Filed: Sep. 15, 2022

(65) Prior Publication Data

US 2024/0097926 A1  Mar. 21, 2024

(51) Int. Cl.
*H04L 12/18* (2006.01)
*G10L 25/78* (2013.01)

(52) U.S. Cl.
CPC .......... *H04L 12/1822* (2013.01); *G10L 25/78* (2013.01); *G10L 2025/783* (2013.01)

(58) Field of Classification Search
None
See application file for complete search history.

(56) References Cited

U.S. PATENT DOCUMENTS

| | | | | |
|---|---|---|---|---|
| 8,848,020 B2 * | 9/2014 | Abate | ................. | H04L 12/1822 709/204 |
| 2002/0196746 A1 * | 12/2002 | Allen | ................. | H04N 21/4788 348/E7.083 |
| 2004/0236593 A1 * | 11/2004 | Swanson | ............. | H04L 65/1101 348/E7.083 |
| 2006/0023062 A1 * | 2/2006 | Elbaze | ..................... | H04N 7/15 348/E7.083 |
| 2006/0244818 A1 * | 11/2006 | Majors | ................ | H04L 65/4038 348/E7.083 |
| 2010/0251140 A1 * | 9/2010 | Tipirneni | ................ | G06F 3/011 715/753 |
| 2011/0072087 A1 * | 3/2011 | Cheung | ............... | H04L 12/1822 709/227 |
| 2013/0215213 A1 | 8/2013 | Power et al. | | |

(Continued)

FOREIGN PATENT DOCUMENTS

| | | |
|---|---|---|
| CN | 1540954 | 10/2004 |
| EP | 1868363 | 12/2007 |

OTHER PUBLICATIONS

International Search Report and Written Opinion for PCT/US2023/022694, mailed on Oct. 9, 2023, 11 pages.

*Primary Examiner* — Scott B Christensen
(74) *Attorney, Agent, or Firm* — DORITY & MANNING P.A.

(57) ABSTRACT

Systems and methods for hosting a teleconference are disclosed herein. The method can include receiving, by a server, a request from a connected participant device to transition from a non-interactive slot to an interactive slot of the teleconference and moving, by the server, the connected participant device from the non-interactive slot to a buffer slot. The method can also include determining, by the server, a longest-inactive participant device among one or more participant devices currently occupying interactive slots; removing, by the server, the longest-inactive participant device from an associated interactive slot; and moving, by the server, the connected participant device from the buffer slot to the associated interactive slot.

14 Claims, 5 Drawing Sheets

(56) References Cited

U.S. PATENT DOCUMENTS

| | | | |
|---|---|---|---|
| 2015/0200982 A1 | 7/2015 | Velagaleti et al. | |
| 2015/0304607 A1* | 10/2015 | Bader-Natal | H04L 12/1813 |
| | | | 348/14.08 |
| 2018/0294986 A1* | 10/2018 | Vidro | H04L 51/046 |
| 2022/0385491 A1* | 12/2022 | Morris | H04L 12/1822 |

* cited by examiner

DYNAMIC PARTICIPANT DEVICE MANAGEMENT FOR HOSTING A TELECONFERENCE

FIELD

The present disclosure relates generally to hosting teleconferences and, more specifically, to dynamic management of participant devices in a teleconference, which can also be referred to as an audio/visual teleconference, a video call, video telephony, etc.

BACKGROUND

Scaling the size of teleconference meetings (e.g., the number of participants in the teleconference, communication capabilities of each participant, etc.) can increase processing and bandwidth demands on computing infrastructure supporting the teleconference (e.g., a videoconference, audioconference, multimedia conference, Augmented Reality (AR)/Virtual Reality (VR) conference, etc.). In order to handle these loads, especially in large calls, some existing solutions can split participants into two types of slots: interactive slots for participants interacting with others in the teleconference (e.g., both sending and receiving communication data, etc.) and non-interactive slots for non-interactive participants (e.g., that are only receiving, but not sending, media communications).

However, participants assigned to the non-interactive slots are often restricted. For example, participants in non-interactive slots may have large buffers for media communications, resulting in a delay in receiving media communications. This delay can mean that certain interactive features, such as providing image reactions (e.g., thumbs-up or raising hand emojis) or answering questions in polls, can arrive delayed, making interactions awkward, difficult, or infeasible. Furthermore, these participants only receiving media communications typically have no means of communicating media communications to others in the teleconference.

SUMMARY

Aspects and advantages of embodiments of the present disclosure will be set forth in part in the following description, or can be learned from the description, or can be learned through practice of the embodiments.

In one embodiment, a method for hosting a teleconference can be provided. The method can include receiving, by a server, a request from a connected participant device to transition from a non-interactive slot to an interactive slot of the teleconference and moving, by the server, the connected participant device from the non-interactive slot to a buffer slot. The method can also include determining, by the server, a longest-inactive participant device among one or more participant devices currently occupying interactive slots; removing, by the server, the longest-inactive participant device from an associated interactive slot; and moving, by the server, the connected participant device from the buffer slot to the associated interactive slot.

In another embodiment, a computing system for hosting a teleconference can be provided. The computing system can include a server comprising one or more processors and a memory comprising instructions that, when executed by the one or more processors, cause the one or more processors to perform a process. The process can include receiving, by the server, a request from a connected participant device to transition from a non-interactive slot to an interactive slot of the teleconference and moving, by the server, the connected participant device from the non-interactive slot to a buffer slot. The process can also include determining, by the server, a longest-inactive participant device among one or more participant devices currently occupying interactive slots; removing, by the server, the longest-inactive participant device from an associated interactive slot; and moving, by the server, the connected participant device from the buffer slot to the associated interactive slot.

In a further embodiment, a non-transitory, computer-readable medium can be provided. The non-transitory, computer-readable medium can comprise instructions that, when executed by a server comprising one or more processors, cause the one or more processors to perform a process. The process can include receiving, by the server, a request from a connected participant device to transition from a non-interactive slot to an interactive slot and moving, by the server, the connected participant device from the non-interactive slot to a buffer slot. The process can also include determining, by the server, a longest-inactive participant device among one or more participant devices currently occupying interactive slot; removing, by the server, the longest-inactive participant device from an associated interactive slot; and moving, by the server, the connected participant device from the buffer slot to the associated interactive slot.

Other aspects of the present disclosure are directed to various systems, apparatuses, non-transitory computer-readable media, participant interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
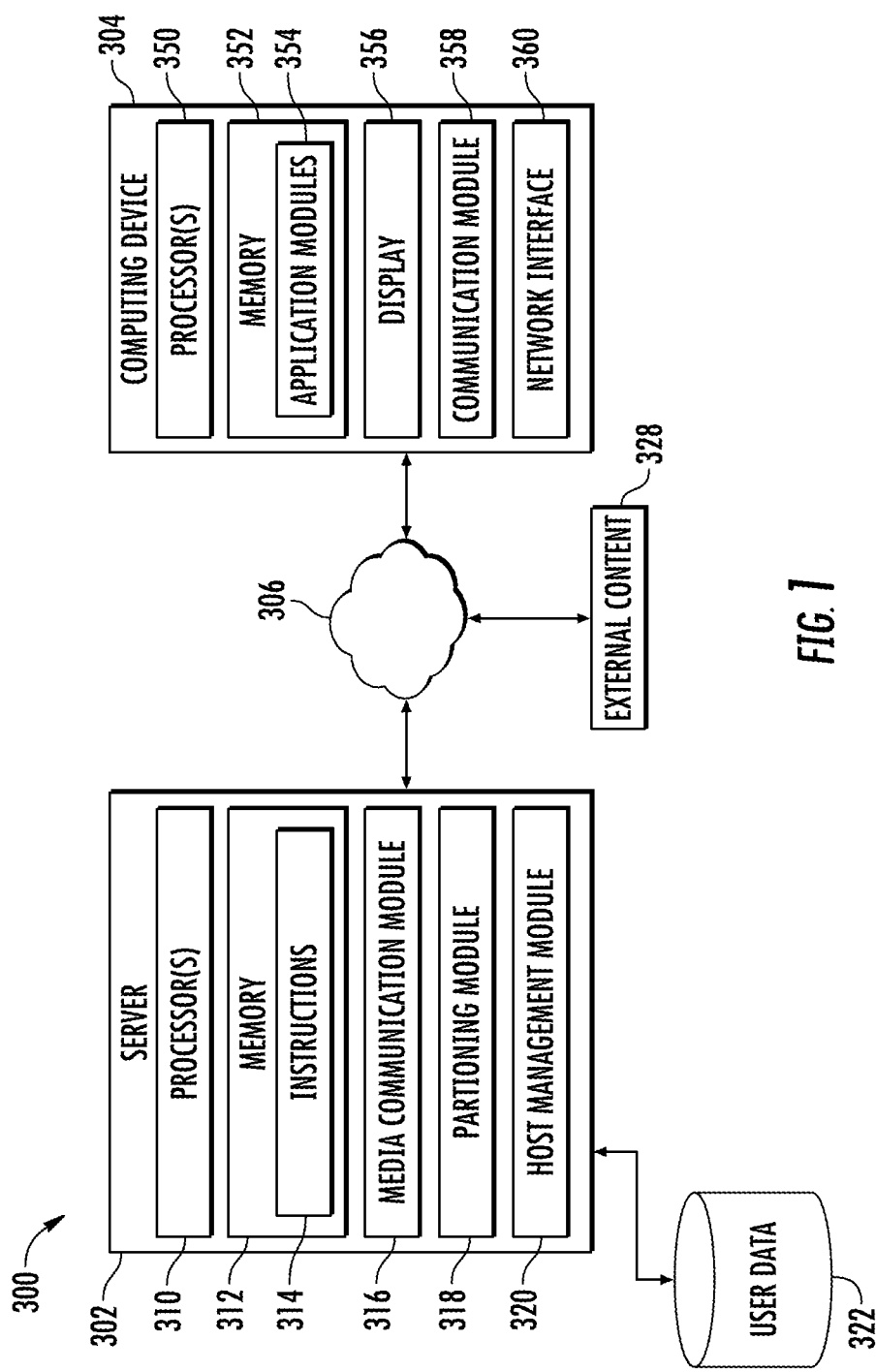
FIG. 1 illustrates a computing system for hosting a teleconference in accordance with some implementations of the present disclosure.

Generally, the present disclosure is directed to dynamic management of slot assignments for participant devices to increase the perceived size of a teleconferencing session. Specifically, the proposed systems and methods are directed to partitioning and dynamic distribution of server capacity between participant devices (e.g., devices utilized by participants) during the course of a teleconference by assigning participants to different slots based on the participant's activity in the teleconference. Slots are "openings" or "roles" in a teleconference session for participant devices, such as interactive slots (e.g., devices both sending and receiving communication data) and non-interactive slots (devices only receiving communication data). Often, a teleconference session may have a maximum number of slots for participants (e.g., a maximum number of 20 slots, with some being interactive slots and others being non-interactive slots).

To increase the size of a teleconferencing session perceived by the participants, a computing system (e.g., a server computing system hosting or facilitating a teleconference session, etc.) can dynamically shift participant devices from non-interactive slots (e.g., slots for participants not currently sending data and unable to send data in the teleconference) to interactive slots (e.g., slots for participant devices that are currently sending data or are able to send data). For example, a teleconference session may be limited to five participant devices sending and receiving data (e.g., in interactive slots). However, because participant devices in non-interactive slots have lower processing and bandwidth requirements than participant devices in interactive slots (e.g., do not need to both send and receive media and can be on a slightly larger delay than participant devices in interactive slots), the computing system can facilitate a teleconference with a large number of total participant devices without the need for each participant device to be in an interactive slot, thus saving computing resources needed for teleconference calls, especially large-scale teleconference calls with hundreds of participants or more.

When a participant needs to switch to an interactive slot, there may be a slight and temporary change in video playback rate as the participant moves between the non-interactive slot and the interactive slot. Because of the use of low-latency streaming technology and the buffer interactive slots, this is likely to last less than one second. Conversely, when a participant is removed from an interactive slot, the participant is transitioned to a non-interactive slot. Since the non-interactive slots requires less processing and bandwidth to manage, the participant may not even notice the transition to the non-interactive slots, or may only notice the same second-or-less change in video playback rate.

By managing assignment of participant computing devices to interactive and non-interactive slots, large-scale teleconferences can be hosted using less processing and bandwidth resources while maintaining call quality and participant interactivity. In such fashion, participant devices can be dynamically managed by moving the participant devices in and out of certain slots to provide what a participant perceives to be a single, continuous meeting connection and interactive participation features to all participants at all times, such that participants can switch between non-interactive and interactive slots without noticing that they have been in a non-interactive slot.

With reference now to the Figures, example embodiments of the present disclosure will be discussed in further detail.

FIG. 1 depicts an example system 300 according to an example embodiment of the present disclosure. System 300 can include a client-server architecture, where a server 302 communicates with one or more computing devices 304 over a network 306. Although one computing device 304 is illustrated in FIG. 1, any number of computing devices can be connected to server 302 over network 306.

Computing device 304 can be, for example, a computing device having a processor 350 and a memory 352, such as a wireless mobile device, a personal digital assistant (PDA), smartphone, tablet, laptop computer, desktop computer, computing-enabled watch, computing-enabled eyeglasses, gaming console, embedded computing system, or other such devices/systems. In short, computing device 304 can be any computer, device, or system that can interact with the server system 302 (sending and receiving data) to implement the present disclosure.

Specifically, the computing device 304 can be a participant computing device 304 (e.g., a participant computing device utilized by participant(s), etc.), and will be referred to as such throughout the present disclosure. For example, the participant computing device 304 may be a discrete computing device (e.g., a smartphone, laptop, wearable device, etc.) utilized by a participant (e.g., a user, a virtualized user such as a bot, etc.) to participate in a teleconference. For another example, the participant computing device 304 may be a specialized computing device configured to facilitate teleconference participation that is utilized by multiple participants (e.g., a computing device connected to audio and video capture devices within a conference room with multiple participants).

Processor 350 of participant computing device 304 can be any suitable processing device and can be one processor or more than one processors that are operably connected. Memory 352 can include any number of computer-readable instructions or other stored data. In particular, memory 352 can include, store, or provide one or more application modules 354. When implemented by processor 350, application modules 354 can respectively cause or instruct processor 350 to perform operations consistent with the present disclosure, such as, for example, running a mapping application or a browser application in order to obtain and display personalized maps. Other modules can include a virtual wallet application module, a web-based email module, a game application module, or other suitable application modules.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Participant computing device 304 can include a display 356. Display 356 can be any suitable component(s) for providing a visualization of information, including, for example, touch-sensitive displays (e.g. resistive or capacitive touchscreens), monitors, LCD screens, LED screens (e.g. AMOLED), or other display technologies.

Participant computing device 304 can further include a communication module 358. The communication module 358 enables the computing device 304 to participate in teleconferences. For example, communication module 358 can include, or can be communicatively coupled to, a microphone, a camera, and other suitable components for enabling a participant to provide audio and visual communications from the computing device 304. Communication module 358 can also include one or more software components for allowing a participant of the computing device 304 to participate in a teleconference, such as including instructions for operating a teleconference software application, which can enable the participant of the participant computing device 304 to interact with other participants in a teleconference, such as providing text chat functionality, screen sharing functionality, hand-raising functionality, polling functionality, breakout room functionality, and other functionality for use in teleconferencing.

Specifically, for example, the communication module 358 may facilitate participation in the teleconference. For example, the communication module 358 may be configured to detect when a participant activates a video capture device. In response, the communication module 358 may be configured to send a request to the server computing system 302, for example, that requests the computing device 304 be moved from a non-interactive slot to an interactive slot.

Participant computing device 304 can further include a network interface 360. Network interface 360 can include any suitable components for interfacing with one more networks, including for example, transmitters, receivers, ports, controllers, antennas, or other suitable components.

Server 302 can be implemented using one or more suitable computing devices and can include a processor 310 and a memory 312. For example, server 302 can be one server computing device or can be a network of server computing devices that are operatively connected. In the instance that server 302 includes a network of server computing devices, such network of server computing devices can be organized into any suitable computing architecture, including parallel computing architectures, sequential computing architectures, or some combination thereof.

Processor 310 can be any suitable processing device and can be one processor or more than one processors which are operably connected. Memory 312 can store instructions 314 that cause processor 310 to perform operations to implement the present disclosure, including performing aspects of method (500) of FIG. 3.

Server 302 can include one or more modules for providing desired functionality. For example, server 302 can include a media communication module 316, a portioning module 318, and a host management module 320.

Server 302 can implement media communication module 316 to provide teleconferencing functionality for the server 302. For example, media communication module 316 can provide a teleconferencing service (as discussed in FIG. 2 below) and associated functionality for the teleconferencing service, such as text chat functionality, screen sharing functionality, hand-raising functionality, polling functionality, breakout room functionality, and other functionality for use in teleconferencing.

Server 302 can implement partitioning module 318 to partition attendees into various slots of attendees. In some embodiments, when participants of the teleconference connect to the server 302, partitioning module 318 can determine which slot of an interactive slots of participants (e.g., participants that will be actively communicating in the teleconference via video, audio, interactive features such as polls or chat, and the like) and a non-interactive slots of participants (e.g., participants who will not be actively communicating in the teleconference and instead will simply be streaming and observing the teleconference). Partitioning module 318 can use various characteristics of the joining participant and/or different aspects of the teleconference to determine which slot to place the joining participant in.

For example, partitioning module 318 can determine that a joining participant should be placed in the interactive slot when a participant device of the joining participant has at least one or both of a camera and microphone active as the participant device joins the teleconference, as the camera and the microphone being active can indicate that the joining participant wishes to actively participate in the teleconference instead of merely observe. In another example, partitioning module 318 can assign any joining participants to the interactive slot until a number of participants in the interactive slot is equal to a total number of participant devices (e.g., a maximum size) of the interactive slot is reached.

The number of participant devices of the interactive slot indicate how many participants can actively participate in the teleconference, and each participant device of the number of participant devices can have computing resources for allowing active participation in the teleconference assigned to the participant device. After the number of participant devices are filled up (e.g., a maximum number of active participants is reached), partitioning module 318 can then assign joining participants to the non-interactive slot.

Partitioning module 318 can also enable participants to transition between the non-interactive slot and the interactive slot or vice versa. For example, partitioning module 318 can receive an indication from a participant device in the non-interactive slot that the participant has turned on a camera or microphone of the participant device or has in some other way indicated a desire to actively participate in the teleconference.

In some embodiments, partitioning module 318 can transition the participant device to a slot in the interactive slots immediately if a slot is still available in the interactive slots. In other embodiments where the interactive slots are full and have no available slots, partitioning module 318 can determine which current participant device in the interactive slots has been inactive the longest (e.g., currently has both microphone and camera turned off, has not sent audio data via a microphone for the longest period of time, has been muted or has turned off video for the longest period of time, has not sent audio data with energy above a certain speech indicator threshold the longest, and the like) and can remove the longest-inactive participant device from the interactive slot the longest-inactive participant device is occupying in the interactive slot. The longest-inactive participant device is then moved to the non-interactive slot. The participant device that requested to join the interactive slot can then be added to the freed-up participant device in the interactive slot.

In some embodiments, the interactive slots can include both active slots and buffer slots. Participant devices in active slots can send audio and video immediately at any time. Buffer slots, on the other hand, are used by partitioning module 318 to temporarily hold participant devices that are being transitioned from the non-interactive slots to an active slot of the interactive slots. For example, partitioning module 318 can receive an indication that a participant device in the non-interactive slot has turned on a microphone, turned on a camera, or has otherwise requested permission to communicate in the teleconference instead of simply observe the teleconference. Partitioning module 318 can move the participant device that made the request to a buffer slot, which is a fast switching action that has a delay too short to be noticed or to cause inconvenience to the participant using the participant device.

Partitioning module 318 then makes the determination of the longest-inactive participant device in the active slots of the interactive slots as discussed above. Partitioning module 318 moves the longest-inactive participant device to the non-interactive slot and then moves the participant device that requested to move to the interactive slot from the buffer slot to the now-vacated active slot.

To partition participants correctly, the algorithm can determine a pivot point "x" for a teleconference having a number "N" of maximum interactive participants. Instead of treating each participant device as equal, pivot point x is used to determine when to place participant devices in interactive active slots, interactive buffer slots, or non-interactive slots. Pivot point x can be a number in between 0 and 1, and can be a number much closer to 1 than 0 (e.g., 0.8). When a participant joins the call, pivot point x is multiplied by number N. When the number of current participants exceeds the result of this calculation, the N available interactive slots can be partitioned into interactive "active" slots and interactive "buffer" slots. The partitioning can be asymmetrical such that x*N slots are "active" slots and (1−x)*N slots are "buffer slots."

In some embodiments, partitioning module 318 can perform multiple transitions of participant devices from the non-interactive slot to the active slot of the interactive slots in parallel if the number of buffer slots is greater than one.

In some embodiments, partitioning module 318 can determine a pivot point for the meeting that determines when partitioning module 318 should begin determining which slot to assign joining participants to. For example, a teleconference can handle T total participants, with N number of participants being in the active slots of participants. Instead of treating all participant spots as equal, a pivot point x can be determined, where x is a number much closer to 1 than to 0 (e.g., 0.8).

When the total number of participants is greater than x*N, partitioning module 318 can partition the interactive slot into a number of active slots A and a number of buffer slots B. This partitioning is asymmetrical such that A is equal to x*N and B is equal to 1−(x*N).

When a meeting size is below x*N, all joining participants can be assigned to active slots of the interactive slots. When the meeting size is above x*N, participants joining the meeting with media active (e.g., a microphone or camera or both turned) on can be added to a free active slot if there are free active slots. If there are no free active slots, the participant joining will be added to the non-interactive slots and, in some embodiments, can have one or more media communication methods turned off (e.g., automatically muting the microphone or turning off the camera if either are active).

Then, as discussed above, if a participant wishes to transition between the non-interactive slot and the active slots of the interactive slots, the participant makes a request with the participant device and partitioning module 318 can temporarily move the participant device to a buffer slot while freeing up an active slot. The buffer slot can have similar functionality to the active interactive slot, such as allowing the participant of the participant device to immediately begin sending media communications to the teleconference.

Furthermore, to enable simple transitions, active slots and buffer slots are all interactive slots, and instead of actively moving the participant device from the buffer slot to the active slot, partitioning module 318 can simply re-label the buffer slot as an active slot and re-label the identified active slot of the longest-inactive participant device as a buffer slot. In this way, computing resources are saved because interactive slots are simply re-labeled and re-purposed instead of actually performing some switch between the slots and active slots.

The selection of x determines how many participants that can simultaneously go through transitioning between the non-interactive slots and the active slots of the interactive slots through the buffer slots. A high value of x provides maximum usage of the interactive slots at the cost of risking a longer delay for participants in the non-interactive slots wishing to transition to the interactive slot because it may take a longer period of time to free up an active slot. A low value of x provides a large capacity for participant device switching at the cost of wasting interactive slots that would potentially not be used.

Server 302 can implement a host management module 320 to allow a host of a teleconference to manage the teleconference. For example, host management module 320 can enable a host of the meeting to manually transition participants between the interactive slot of participants and the non-interactive slot of participants, to create polls, to create breakout rooms for participants, and perform other hosting features of the teleconference.

Server 302 can be coupled to or in communication with one or more databases, including a database providing user data 322, a geographic information system 324, a database containing reviews 326, and external content 328. Although user data 322 and databases 324, 326, and 328 are depicted in FIG. 1 as external to server 302, one or more of such databases can be included in memory 312 of server 302. Further, user data 322, 324, 326, and 328 can each correspond to a network of databases rather than a single data source.

User data 322 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a participant account. Generally, according to an aspect of the present disclosure, such data can be analyzed to determine the participant device may request to transition from a non-interactive slot to an interactive slot in the teleconference.

Importantly, the above provided examples of user data 322 are simply provided for the purposes of illustrating potential data that could be collected, in some embodiments, to determine who participants of the teleconference are (e.g., if they have permission to join the teleconference and other relevant data). However, such user data is not collected, used, or analyzed unless the participant has consented after being informed of what data is collected and how such data is used. Further, in some embodiments, the participant can be provided with a tool to revoke or modify the scope of permissions. In addition, certain information or data can be treated in one or more ways before it is stored or used, so that personally identifiable information is removed or stored in an encrypted fashion.

Computer-based system 300 can further include external content 328. External content 328 can be any form of external content including news articles, webpages, video files, audio files, written descriptions, ratings, game content, social media content, photographs, commercial offers, transportation method, weather conditions, or other suitable external content. Server system 302 and computing device 304 can access external content 328 over network 306. External content 328 can be searched by server 302 according to known searching methods and can be ranked according to relevance, popularity, or other suitable attributes, including location-specific filtering or promotion.

Network 306 can be any type of communications network, such as a local area network (e.g., intranet), wide area network (e.g., Internet), or some combination thereof and can include any number of wired or wireless links. In general, communication between the server 302 and a computing device 304 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, computing device 304 can freely move throughout the world and communicate with server 302 in a wireless fashion.

Figure 2:
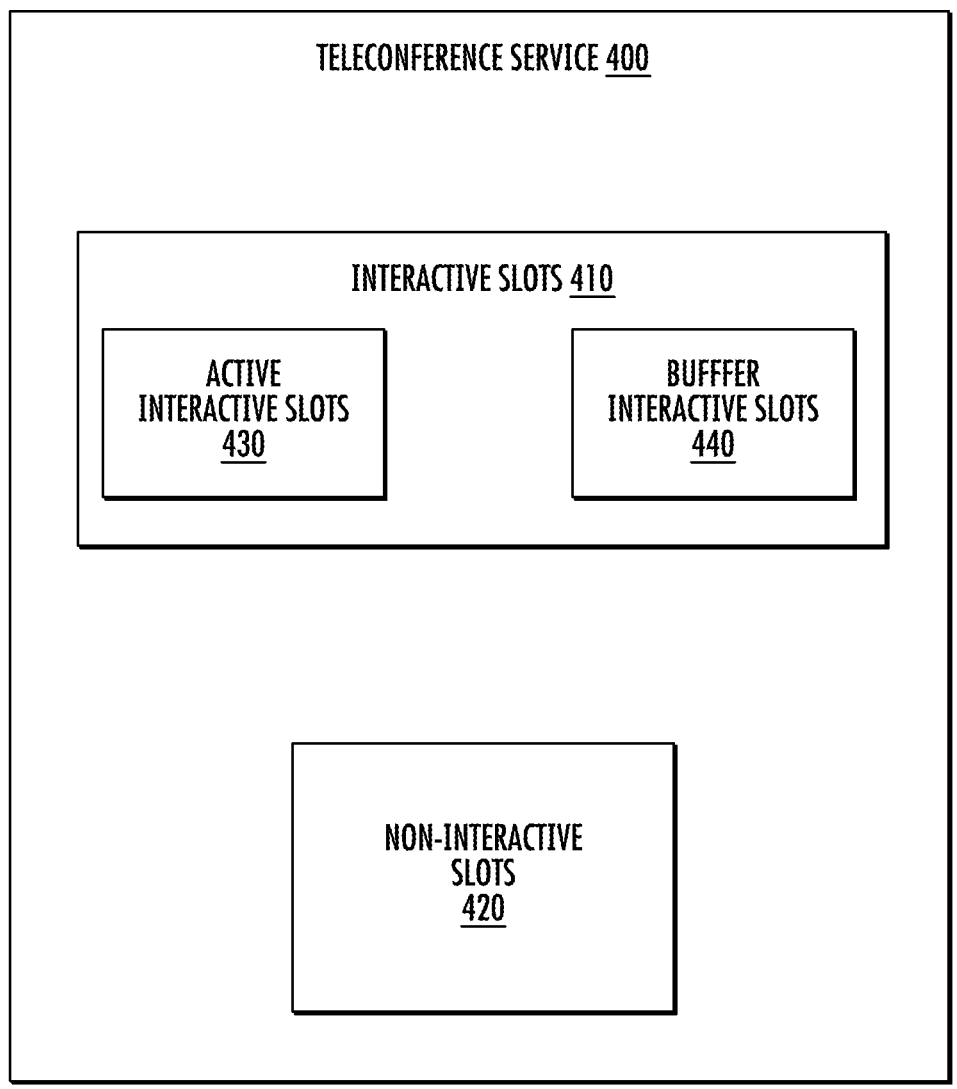
FIG. 2 illustrates an example teleconferencing service in accordance with some implementations of the present disclosure.

FIG. 2 illustrates an example teleconferencing service 400 in accordance with some implementations of the present disclosure. For example, the teleconference service 400 may be provided by the server 302 of FIG. 1 (e.g., using the media communication module 318, partitioning module 318, host management module 320, etc.). Teleconferencing service 400 can include interactive participant slots 410 and non-interactive slots 420. Interactive slots 410 are slots that allow for a participant device in that slot to provide media communications, such as video and audio data, to other participants in every other slot of the teleconference during the duration of the teleconference. The interactive slots 410 can include active interactive slots 430 and buffer interactive slots 440. Active interactive slots 430 allow for participant devices assigned to those slots to freely use media communications in the teleconference. Buffer interactive slots 440 are "transition" slots that are used to temporarily store participant devices that are being moved from non-interactive slots 420 to active interactive slots 430. In some embodiments, participant devices assigned to buffer slots 440 can immediately begin performing the functionality of a participant device that is assigned to the active interactive slot 430.

There are typically a much larger number of non-interactive slots 420 than interactive slots 410, as non-interactive slots 420 require less computing resources than interactive slots 410. For example, non-interactive slots 420 do not require computing resources (e.g., power, memory, compute cycles, bandwidth, etc.) to handle the receiving of media communications from participant devices assigned to the non-interactive slots 420, as the participants of the participant devices assigned to non-interactive slots 420 are only streaming the teleconference and not actively participating in the teleconference.

Figure 3:
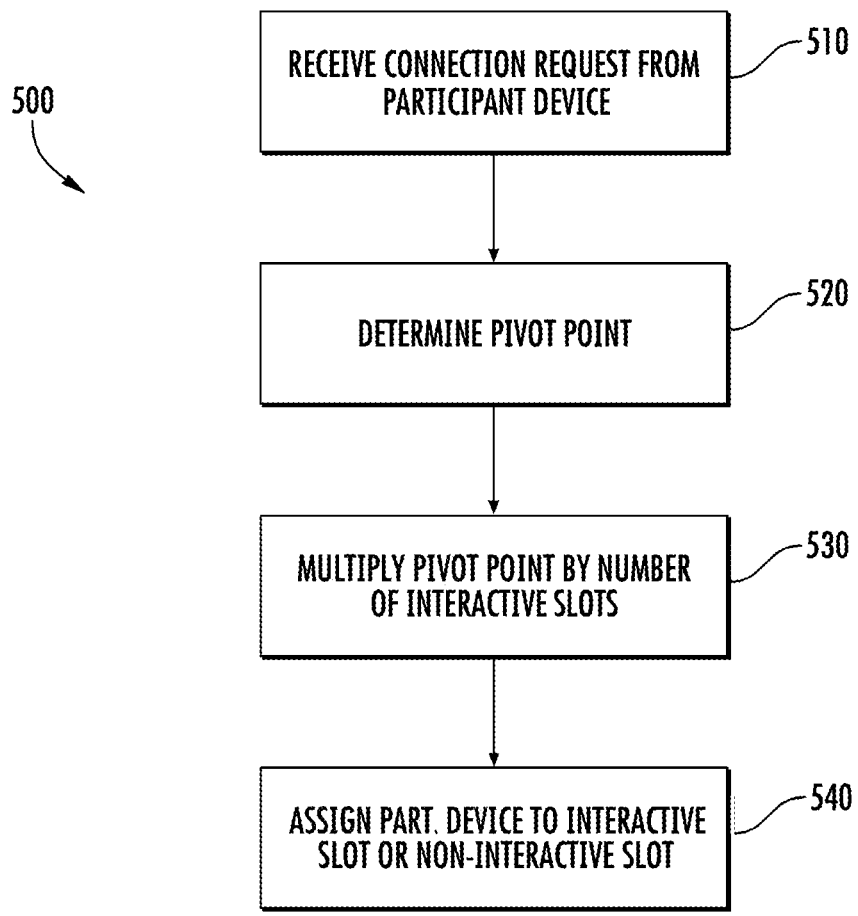
FIG. 3 is a flow chart illustrating a method for assigning a participant device to a participant device in a teleconference in accordance with some implementations of the present disclosure.

FIG. 3 is a flow chart illustrating a method 500 for assigning a participant device to a slot in a teleconference in accordance with some implementations of the present disclosure. In some embodiments, method 500 is executed by a computing system, such as server 302 of FIG. 1.

At operation 510, the computing system can receive a connection request from a participant device to join a teleconference (e.g., via a wireless network, etc.). For example, a participant of a participant device may provide a selection input that selects a link to join the teleconference from an email, a text message, a calendar item, a website, or any other suitable data structure that can contain links to a teleconference. The request can be any manner of request sufficient to allow the participant device to connect to the teleconference. For example, the request may be data packet(s) that identify aspects of the participant device or the participant (e.g., an IP address, bandwidth capabilities, processing capabilities, historical participant interactivity, etc.).

At operation 520, in some implementations, the computing system can determine a pivot point for the teleconference. A pivot point can be a point at which the computing system should begin determining which slot to assign joining participant devices to. For example, a teleconference can handle T total participant devices, with N number of participants being in the interactive slots. Instead of treating all participant slots as equal, a pivot point x can be determined, where x is a number much closer to 1 than to 0 (e.g., 0.8).

At operation 530, the computing system can multiply the pivot point by the number of interactive slots to receive a result. When the total number of participants is greater than x*N, the server can partition the interactive slots into a number of active slots "A" and a number of buffer slots "B". This partitioning can be asymmetrical such that A is equal to x*N and B is equal to 1−(x*N).

At operation 540, the computing system can assign the participant device to an interactive slot or non-interactive slot. When a meeting size is below x*N, all joining participant devices can be assigned to active slots of the interactive slots. When the meeting size is above x*N, participant devices joining the meeting with media capture devices active (e.g., a microphone or camera or both turned on) can be added to a free active slot if there are free active slots. If there are no free active slots, the participant joining will be added to the non-interactive slot and, in some embodiments, can send instructions to deactivate one or more communication capture devices (e.g., automatically muting the microphone or turning off the camera if either are active).

Then, as discussed above, if a participant device provides a request to transition between the non-interactive slot and the active slots of the interactive slot, the computing system can temporarily move the participant device to a buffer slot while freeing up an active slot. The buffer slot can have similar functionality to the active slot, such as allowing the participant of the participant device to immediately begin sending media communications to the teleconference.

Furthermore, to enable simple transitions, active slots and buffer slots are all interactive slots, and instead of actively moving the participant device from the buffer slot to the active slot, the computing system can simply re-label the buffer slot as an active slot and re-label the identified active slot of the longest-inactive participant device as a buffer slot. In this way, computing resources are saved because interactive slots are simply re-labeled and re-purposed instead of actually performing some switch between the buffer slots and active slots.

Figure 4:
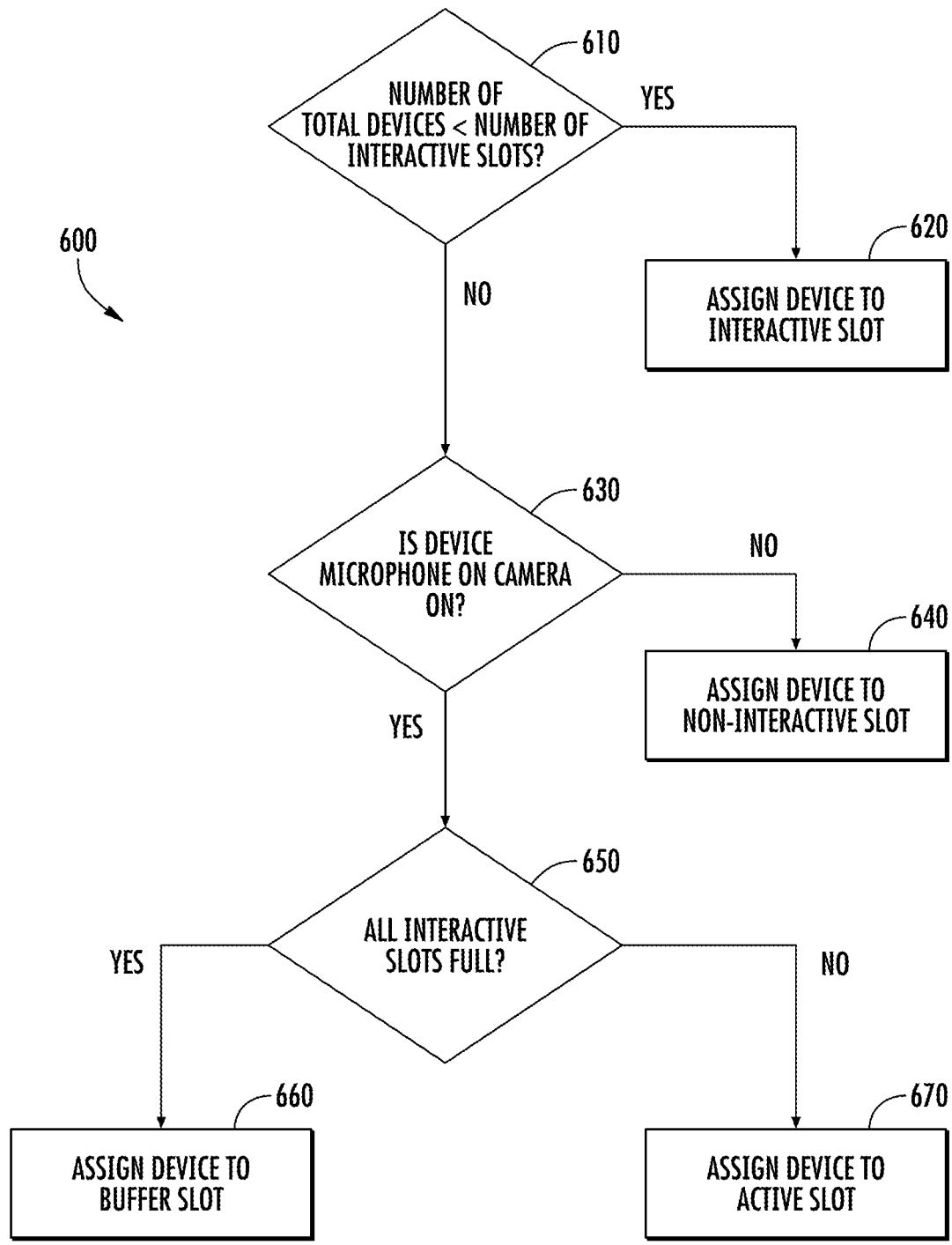
FIG. 4 is a flow chart illustrating a method for assigning a participant device to a participant device in a teleconference in accordance with further implementations of the present disclosure.

FIG. 4 is a flow chart illustrating a method 600 for assigning a participant device to a slot in a teleconference in accordance with further implementations of the present disclosure. In some embodiments, method 600 can be executed by a computing system, such as server 302 of FIG. 1.

At operation 610, the computing system can determine if the total number of connected devices is less than the number of interactive slots available for the teleconference. If the total number of connected devices is less than the number of interactive slots available (YES at operation 610), the computing system can assign any joining participants to an interactive slot until a number of participants in the interactive slots is equal to the total number of interactive slots (e.g., a maximum size) (at operation 620). The number of interactive slots indicate how many participant devices can actively participate in the teleconference, and each participant device of the number of participant devices can have computing resources for allowing active participation in the teleconference assigned to the participant device. In some embodiments, making this determination can include making this determination based on a determined pivot point and resulting multiplication result.

If the total number of connected devices is greater than the number of interactive slots (NO at operation 610), the computing system can determine if the requesting device's microphone or camera is currently on (at operation 630). If the device does not have a microphone or camera turned on (NO at operation 630), the computing system can assign the device to a non-interactive slot (at operation 640). If the device's camera or microphone is currently active (YES at operation 630), the computing system can determine if all interactive slots are currently full (at operation 650).

If no interactive slots are currently available in the teleconference (YES at operation 650), the computing system can assign the participant device to a buffer slot (at operation 660) and then assign the participant device to an active slot from the buffer slot as described below in relation to FIG. 5. If one or more interactive slots are available (NO at operation 650), the participant device can be assigned by the computing system to an open active interactive slot (at operation 670).

Figure 5:
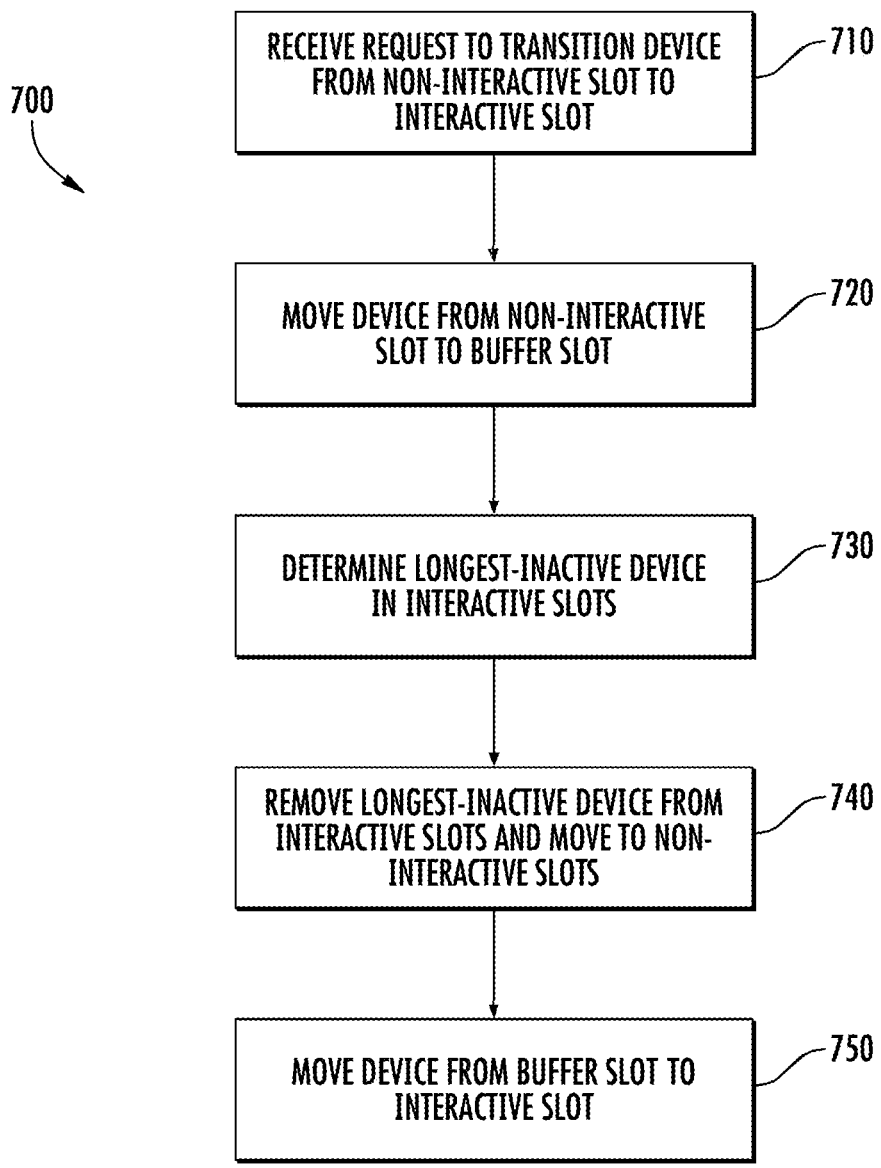
FIG. 5 is a flow chart illustrating a method for transitioning a device from a non-interactive slot to an interactive slot in a teleconference in accordance with some implementations of the present disclosure.

FIG. 5 is a flow chart illustrating a method 700 for transitioning a device from a non-interactive slot to an interactive slot in a teleconference in accordance with some implementations of the present disclosure. In some embodiments, method 700 can be performed by a computing system, such as server 302 of FIG. 1.

At operation 710, the computing system can receive a request to transition a participant device from a non-interactive slot to an interactive slot. In some embodiments, the request to transition from a non-interactive slot to an interactive slot can be a participant of the participant device turning on a camera or a microphone or both of the participant device. In other embodiments, a participant of the participant device can provide a selection input that indicates a request to switch to an interactive slot using, for example, a menu selection or other selection within a participant interface of the teleconference software application.

At operation 720, the computing system can move the participant device from the non-interactive slot to an open buffer slot of the interactive slots. In some embodiments, the computing system can transition the participant device to a slot in the interactive slots immediately if a participant device is still available in the interactive slot.

At operation 730, the computing system can determine the longest-inactive device of the participant devices currently using active interactive slots. In some embodiments, the server can determine which current participant device in the interactive slot has been inactive the longest (e.g., currently has both microphone and camera turned off, has not sent audio data via a microphone for the longest period of time, has been muted or has turned off video for the longest period of time, has not sent audio data with an energy above a certain speech indicator threshold the longest, and the like)

At operation 740, the computing system can remove the longest-inactive participant device from the slot the longest-inactive participant device is occupying in the active interactive slots. The longest-inactive participant device is then moved to the non-interactive slots.

At operation 750, the computing system can move the participant device to the freed-up active slot in the interactive slots from the buffer slot.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for hosting a teleconference, the method comprising:
   determining, by a server, a pivot point for the teleconference, the pivot point indicative of a number of connected devices past which participant devices should be separated into a plurality of interactive slots and a plurality of non-interactive slots;
   multiplying, by the server, the pivot point by a number of interactive slots associated with the teleconference to obtain a result;
   in response to receiving, by the server, a connection request from a participant device to connect to the teleconference:
      determining that a number of participant devices currently connected to the teleconference is greater than or equal to the result; and
      in response to determining that the number of participant devices is greater than or equal to the result, assigning the participant device to a non-interactive slot of the plurality of non-interactive slots;
   receiving, by the server, a transition request from the participant device to transition from a non-interactive slot of the plurality of non-interactive slots to an interactive slot of the plurality of interactive slots of the teleconference;
   moving, by the server, the participant device from the non-interactive slot to a buffer slot, wherein the participant device can interact audibly or visually with the teleconference from the buffer slot;
   determining, by the server, a longest-inactive participant device among one or more participant devices currently occupying interactive slots;
   removing, by the server, the longest-inactive participant device from an associated interactive slot; and
   moving, by the server, the participant device from the buffer slot to the associated interactive slot.

2. The method of claim 1, wherein the participant device is assigned to the interactive slot when the number of participant devices connected to the teleconference is less than a maximum number of interactive participant devices.

3. The method of claim 1, wherein the transition request from the participant device to transition from the non-interactive slot to the interactive slot is generated in response to a participant associated with the participant device activating at least one of a microphone and a camera of the participant device.

4. The method of claim 1, wherein determining the longest-inactive participant device among the one or more participant devices currently occupying interactive slots includes determining which participant device among the one or more participant devices currently occupying interactive slots least recently had video active.

5. The method of claim 1, wherein determining the longest-inactive participant device among the one or more participant devices currently occupying interactive slots includes determining which participant device among the one or more participant devices currently occupying interactive slots least recently had audio active.

6. The method of claim 1, wherein determining the longest-inactive participant device among the one or more participant devices currently occupying interactive slots includes determining which participant device among the one or more participant devices currently occupying interactive slots least recently has sent audio with an energy above a speech indicator threshold.

7. A computing system for hosting a teleconference, the computing system comprising:
a server comprising one or more processors and a memory comprising instructions that, when executed by the one or more processors, cause the one or more processors to perform a process, the process comprising:
determining, by the server, a pivot point for the teleconference, the pivot point indicative of a number of connected devices past which participant devices should be separated into a plurality of interactive slots and a plurality of non-interactive slots;
multiplying, by the server, the pivot point by a number of interactive slots associated with the teleconference to obtain a result; and
in response to receiving, by the server, a connection request from a participant device to connect to the teleconference:
determining, by the server, that a number of participant devices currently connected to the teleconference is greater than or equal to the result; and
in response to determining that the number of participant devices is greater than or equal to the result, assigning, by the server, the participant device to the non-interactive slot of the plurality of non-interactive slots:
receiving, by the server, a transition request from the participant device to transition from a non-interactive slot to an interactive slot of the teleconference;
moving, by the server, the participant device from the non-interactive slot to a buffer slot, wherein the participant device can interact audibly or visually with the teleconference from the buffer slot;
determining, by the server, a longest-inactive participant device among one or more participant devices currently occupying interactive participant slots;
removing, by the server, the longest-inactive participant device from an associated interactive slot; and
reassigning, by the server, the buffer slot as an interactive slot.

8. The computing system of claim 7, wherein the participant device is assigned to the interactive slot when the number of participant devices connected to the teleconference is less than a maximum number of interactive participant devices.

9. The computing system of claim 7, wherein the transition request from the participant device to transition from the non-interactive slot to the interactive slot is generated in response to a participant associated with the participant device activating at least one of a microphone and a camera of the participant device.

10. The computing system of claim 7, wherein determining the longest-inactive participant device among the one or more participant devices currently occupying interactive slots includes determining which participant device among the one or more participant devices currently occupying interactive slots least recently had video active.

11. The computing system of claim 7, wherein determining the longest-inactive participant device among the one or more participant devices currently occupying interactive slots includes determining which participant device among the one or more participant devices currently occupying interactive slots least recently had audio active.

12. The computing system of claim 7, wherein determining the longest-inactive participant device among the one or more participant devices currently occupying interactive slots includes determining which participant device among the one or more participant devices currently occupying interactive slots least recently has sent audio with an energy above a speech indicator threshold.

13. A non-transitory, computer-readable medium comprising instructions that, when executed by a server comprising one or more processors, cause the one or more processors to perform a process for hosting a teleconference, the process comprising:
determining, by the server, a pivot point for the teleconference, the pivot point indicative of a number of connected devices past which participant devices should be separated into a plurality of interactive slots and a plurality of non-interactive slots;
multiplying, by the server, the pivot point by a number of interactive slots associated with the teleconference to obtain a result;
receiving, by the server, a connection request from a participant device to connect to the teleconference, the connection request indicating if at least one of a microphone and a camera of the participant device is currently active, wherein the participant device enables a participant associated with the participant device to provide media communications to the teleconference when the participant device is assigned to the interactive slot;
in response to receiving, by the server, the connection request from the participant device:
determining that a number of participant devices currently connected to the teleconference is greater than or equal to the result; and
in response to determining that the number of participant devices is less than or equal to the result, assigning the participant device to the interactive slot; and
in response to determining that the number of participant devices is greater than or equal to the result, assigning the participant device to the non-interactive slot;
receiving, by the server, a transition request from the connected participant device to transition from a non-interactive slot to an interactive slot, moving, by the server, the participant device from the non-interactive slot to a buffer slot, wherein the participant device can interact audibly or visually with the teleconference from the buffer slot;

determining, by the server, a longest-inactive participant device among one or more participant devices currently occupying interactive slots, removing, by the server, the longest-inactive participant device from an associated interactive slot; and reassigning, by the server, the buffer slot as an interactive slot.

14. The non-transitory, computer-readable medium of claim 13, wherein determining the longest-inactive participant device among the one or more participant devices currently occupying interactive slots includes at least one of determining which participant device among the one or more participant devices currently occupying interactive slots least recently had audio active and determining which participant device among the one or more participant devices currently occupying interactive slots least recently had video active.

* * * * *